United States Patent [19]

Wright

[11] Patent Number: 4,858,874

[45] Date of Patent: Aug. 22, 1989

[54] REAR MOUNTED MIRROR APPARATUS FOR VEHICLES

[76] Inventor: John Wright, 801 British, Grand Prairie, Tex. 75050-2334

[21] Appl. No.: 258,070

[22] Filed: Oct. 14, 1988

Related U.S. Application Data

[63] Continuation of Ser. No. 54,573, May 27, 1987, abandoned.

[51] Int. Cl.$^4$ ............................................. A47G 1/16
[52] U.S. Cl. .................................. 248/467; 248/480; 248/284
[58] Field of Search ............... 248/467, 480, 466, 486, 248/476, 487, 205.4, 544, 284; 350/627, 625, 631, 632, 633

[56] References Cited

U.S. PATENT DOCUMENTS

| | | | |
|---|---|---|---|
| 1,394,440 | 10/1921 | Oishei | 248/487 |
| 1,428,042 | 9/1922 | Hodny | 248/487 X |
| 2,197,280 | 4/1940 | Topping | 248/467 X |
| 2,979,989 | 4/1961 | Calder, Jr. | 350/633 |
| 3,031,929 | 5/1962 | Prutzman, Jr. | 248/486 |
| 3,187,628 | 6/1965 | Canns et al. | 248/476 X |
| 3,394,979 | 7/1968 | Wilson | 248/476 X |
| 4,187,001 | 2/1980 | Redwitz et al. | 350/632 X |
| 4,253,738 | 3/1981 | Linkous | 248/480 X |
| 4,605,292 | 8/1986 | McIntosh | 248/467 |
| 4,687,305 | 8/1987 | Harris | 248/480 X |

FOREIGN PATENT DOCUMENTS

| | | | |
|---|---|---|---|
| 3312320 | 10/1984 | Fed. Rep. of Germany | 350/631 |
| 1177752 | 1/1970 | United Kingdom | 350/632 |

Primary Examiner—Ramon S. Britts
Assistant Examiner—Karen J. Chotkowski
Attorney, Agent, or Firm—Daniel Rubin

[57] ABSTRACT

A rear window mirror apparatus for observing blind spot areas to the rear and side of an automobile and to optically transmit visualization thereof to the rear view mirror at the driver's station. Comprising the apparatus is a more or less U-shaped channel-like frame defining an open central cavity in which angled mirrors are secured for receiving outward reflections from blind spot areas and transmitting the reflections through a front wall aperture. A hinged lower support provides an adhesive pad for securing the frame to the window surface at the underside and an upper elongated slotted bar likewise including an adhesive pad provides for mounting the upperside onto the window surface. The longitudinal slot on the bar receives a bolt extending upstanding from the top surface of the frame. By adjusting the slot relative to the bolt the effective length of the bar can be varied to accommodate different window slopes of the various automobile designs for which such a mirror is contemplated. It also enables cooperation with the hinge of the lower support to effect adjusted optical alignment of the mirror surfaces with respect to the transmission path from the frame aperture toward the rear view mirror at the driver's station.

6 Claims, 1 Drawing Sheet

REAR MOUNTED MIRROR APPARATUS FOR VEHICLES

This application is a continuation of application Ser. No. 054,573, filed May 27, 1987 and now abandoned.

TECHNICAL FIELD

The field of art to which the invention pertains comprises the art of mirror vision apparatus for a road type vehicle.

BACKGROUND OF THE INVENTION

The use of windshield-mounted rear view mirrors at the driver's station of an automobile and/or other road-type vehicles has been standard equipment substantially since the commercialization of the automobile. In recent years, the use of side view mirrors on both the driver and passenger sides has largely become standard or at least commonplace in order to further enhance at-a-glance driver vision in and about the sides of the vehicle. Notwithstanding, it has been recognized that areas of sight at the sides and slightly to the rear of the vehicle termed "blind spots" are frequently obscured from the mirror sight of the driver. For overcoming the absence of vision in those areas, most drivers tend to rely on insight or guess as to when anything of significance might reasonably be disposed in one or more of the "blind spots". When another vehicle is at a blind spot location, it frequently cannot be seen in the standard rear view mirror or via the side view mirrors. To give vision to the blind spots it has been proposed to utilize accessory mirrors mounted on or in the vicinity of the vehicle rear window for communicating a mirrored vision from and about the blind spots forward to where it can be seen by the driver. Apparatus for that purpose is disclosed for example in U.S. Pat. Nos. 1,877,977; 1,986,033; and 2,398,354.

SUMMARY OF THE INVENTION

This invention relates to rear window mirror apparatus for automobiles or other road type vehicles. More specifically, the invention relates to such mirror apparatus optionally suitable for either exterior or interior mounting onto the rear window of an automobile to provide at-a-glance viewing of the blind spots by a driver. Comprising the mirror apparatus is a frame or housing containing angled dual mirror reflecting surfaces that are exposed through apertures to both sides of the frame and through an aperture in the front of the frame in optical alignment with the rear view windshield mirror at the driver's station. An elongated support bar attaches to one surface of the frame for externally mounting onto the top side or underside of the frame depending on its orientation when installed. The support bar cooperates with a hinged support secured to the frame on the opposite and parallel surface and both supports include an adhesive pad for direct mounting onto the glass surface of the rear window. By appropriately positioning the supports and frame, and adjusting the effective length of the support bar, the mirrors contained within the frame are able to view both blind spot areas and reflect any images thereat into the standard rear view mirror at the driver's station. For effecting adjustment to accommodate the variety of varying window slopes of today's vehicles, the elongated bar includes a longitudinal slot enabling its effective length to be varied. Use of the slot also enables pivoting the frame about the hinge support until accurate optical alignment is achieved between the dual mirrors at the rear window and the rear view mirror at the driver's station with which they are intended to optically cooperate.

It is therefore an object of the invention to provide a novel mirror apparatus for optically communicating blind spot areas from the rear window vicinity of a vehicle to the standard rear view mirror at the driver's station.

It is a further object of the invention to provide a novel apparatus as in the previous object that is suitable for either interior or exterior mounting and includes a support structure able to accommodate the various rear window slopes of today's autos without sacrificing the intended operational performance of the mirror.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 1:
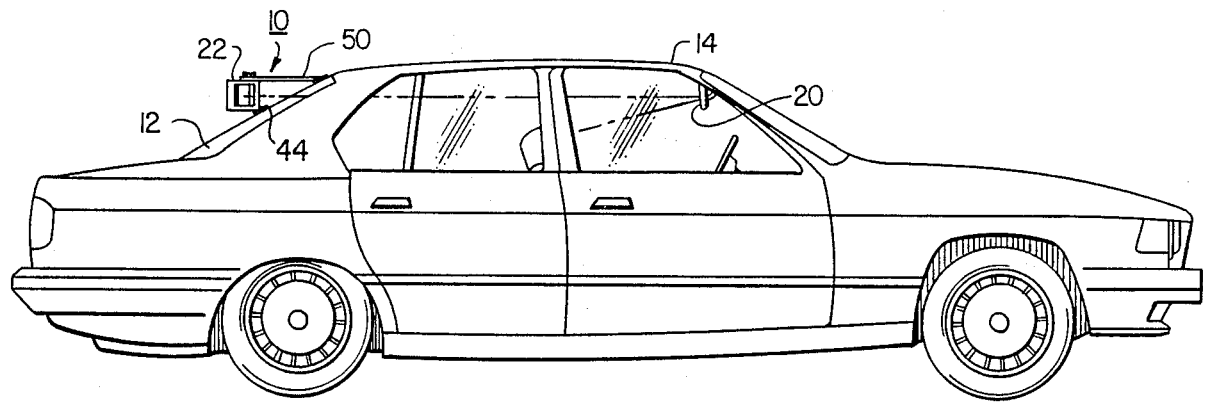
FIG. 1 is a side elevation of an automobile on which the rear window mirror apparatus of the invention has been mounted.
Figure 2:
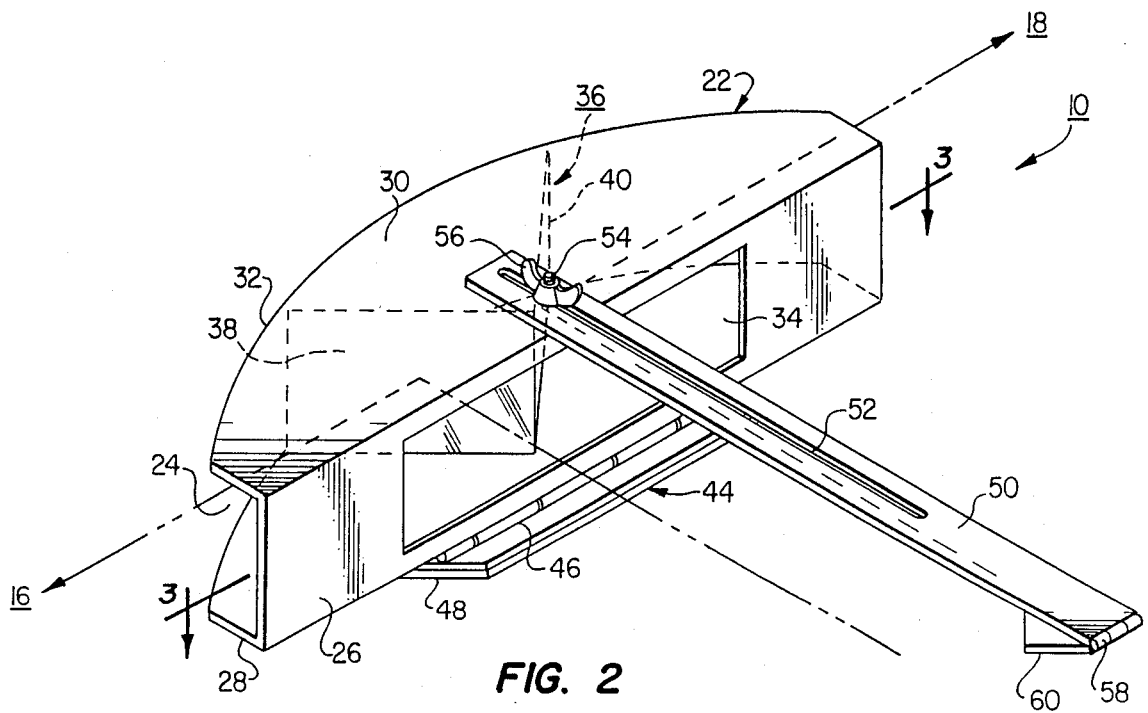
FIG. 2 is an isometric enlargement of the rear window apparatus hereof.
Figure 3:
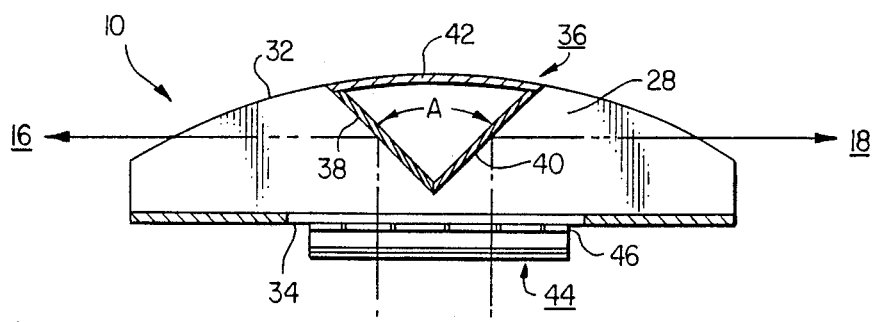
FIG. 3 is a sectional view as seen substantially from the position 3—3 of FIG. 2.

In the description which follows, like parts are marked throughout the specification and drawings with the same reference numerals respectively. The drawing figures are not necessarily to scale and in certain views parts may be drawn rotated into the plane of the drawing for purposes of clarity.

Referring now to the drawings, the rear window mirror apparatus hereof is generally designated 10 and is adapted, for mounting externally or internally onto a sloped rear window 12 of a vehicle 14. Whether mounted interior or exterior, the unit 10 is adapted to visualize the presence of whatever is in the blind spot areas as indicated for example at 16 and 18 and reflect visual images thereof into rear view mirror 20 for at-a-glance driver viewing.

Comprising the mirror apparatus hereof is a more or less U-shaped frame 22 having an open internal cavity 24 contained between front wall 26 and spaced apart parallel upper and lower walls 28 and 30 respectively that terminate rearwardly in concentric arcuate edges 32. Centrally defined in front wall 26 is a rectangular aperture 34 behind which a dual faced mirror unit 36 is positioned and secured in cavity 24.

The mirror unit 36 includes dual, relatively angled mirror surfaces, 38 and 40 upstanding in cavity 24 with a coextensive height so that their upper and lower edges can be secured between the inside surfaces of lower frame wall 28 and upper frame wall 30 as by cementing. Further, securing the mirror units together so as to assist in maintaining the angle "A" between the mirrored surfaces is a rear back plate 42 arcuately extending substantially coincident with the arcuate shape of edge 32. The angle A between mirrors 38 and 40 may be 90° as shown or can be selected to suit depending on whether installation is primarily intended for exterior or interior mounting and the specific automobile rear window shape for which use is contemplated.

For mounting of the frame 22 onto the rear window 12 there is provided a lower support 44 having a hinge mount 46 and an adhesive pad 48 of a well known type adapted to adhere directly secured onto the surface of window 12. For securing frame 22 at its upper surface 30 there is provided an upper support in the form of an elongated bar 50 that includes a longitudinal slot 52 adapted to receive a vertically oriented bolt 54 by which the bar can be secured thereat via a wing nut 56. At its opposite end, bar 50 includes a hinge 58 connected to adhesive pad 60 similar to adhesive pad 48 described supra. It will be appreciated that as thus described bar 50 represents the upper support and unit 44 represents the lower support as would normally be intended for exterior mounting on a forward sloped rear window 12 in the manner of FIG. 1. Where interior mounting is preferred or use thereof is contemplated for a rearwardly sloped rear window, the entire apparatus 10 can essentially be inverted whereby bar 50 becomes the lower support and unit 44 becomes the upper support.

For mounting the apparatus 10, either exterior or interior, the frame 22 is positioned such that the reflections received by mirrors 38 and 40 from the blind spot areas 16 and 18 will reflect directly into rear view mirror 20 where it can be seen at-a-glance by a driver seated thereat. In order to ensure accurate vertical orientation of the mirror surfaces 38 and 40 relative to mirror 20, the frame 22 can be tilted or pivoted about hinge 46 after loosening wing nut 56 to in effect adjustably reduce or increase the effective length of the bar 50. By means of the wing nut 56 in combination with the slotted bar 50, adjustment to ensure reflection from mirror unit 36 to the driver's line of sight in mirror 20 can be readily and conveniently preset.

By the above disclosure, there has been described a novel rear window mirror apparatus for automobiles and other on-road vehicles. The apparatus is simple in construction and yet reliably effective in providing information about the presence of obstacles or whatever in the relatively obscure blind spot areas in and about the automobile. By virtue of the adjustment features provided by the support pads 44 and the longitudinal slot of bar 50, substantially any slope of rear window 12 can be readily accommodated by the flexibility afforded in assembly via the adjustment slot 52 for securing the bar by means of wing nut 56. While relatively simple in construction the rear window mirror apparatus hereof overcomes and satisfies a longfelt need in eliminating the guesswork long associated with the blind spot areas about an automobile.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A mirror apparatus for mounting onto a variably angled rear window of an on-road vehicle having a rear view mirror at the driver's station comprising in combination:

a frame defining a central cavity and providing apertures for optical transmission to and from said cavity;

mirror means consisting of a substantially intersecting dual mirror surface for cooperating with the rear view mirror at the driver's station to simultaneously transmit visual images from at least two optically obscure areas behind the vehicle to said driver's station mirror;

said mirror means being mounted in said central cavity in an angular orientation to at least a pair of said apertures for effecting reflective image transmission from a first to a second of said apertures; and mounting means for attaching said frame to the variably angled rear window surface of a vehicle on which the mirror apparatus is to be utilized; said mounting means including a pair of support means each secured to opposed first and second surfaces of said frame for attaching said frame to the window surface and including presettable means operably displaceable in the longitudinal direction of the vehicle for adjustably securing said frame and mirror means relative to the angled plane of the window surface and to thereby effect a secured optical alignment through said apertures to the rear view mirror at the driver's station.

2. A mirror apparatus according to claim 1 in which said support means comprises first support means including hinge means secured to said first surface of said frame and an adhesive pad for securing the hinge means onto a first selected area of the window surface and second support means including said presettable means which comprise a rigid longitudinally extending elongated member displaceably attachable to said second frame surface and adapted for longitudinal displacement relatively between said frame and the window surface and an adhesive pad at the window attachment end of said member for adhesive mounting onto another selected area of the window surface whereby said presettable means enables presetting the effective length of said elongated member to accommodate the angle dimensions of the rear window surface on which the apparatus is to be mounted while effecting said optical alignment between the reflection surfaces of said mirror means and the rear view mirror of the vehicle.

3. A mirror apparatus according to claim 2 in which said frame includes a bolt attachment on said second surface to which said member is secured and said member includes a longitudinal slot through which to receive said bolt attachment while permitting the relative displacement between said member and said frame for effecting said optical alignment.

4. A mirror apparatus according to claim 3 in which said support means is operably suited for mounting said frame on the exterior surface of a vehicle rear window.

5. A mirror apparatus according to claim 3 in which said support means is alternately suited for operable mounting on either surface of a vehicle rear window.

6. A mirror apparatus according to claim 4 in which when attached on a window surface the first of said frame surfaces comprises an exterior undersurface of said frame and the second surface of said frame comprises an exterior upper surface of said frame.

* * * * *